US009664092B2

(12) United States Patent
Ratan et al.

(10) Patent No.: US 9,664,092 B2
(45) Date of Patent: May 30, 2017

(54) DIAGNOSING SYSTEM FOR REDUCTANT DOSING SYSTEM

(71) Applicant: Cummins Emission Solutions, Inc., Columbus, IN (US)

(72) Inventors: Santosh Kumar Ratan, Columbus, IN (US); Bryce R. Larson, Seymour, IN (US); Abhijeet Singh Chauhan, Columbus, IN (US); Wei Huang, Columbus, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 129 days.

(21) Appl. No.: 14/817,728

(22) Filed: Aug. 4, 2015

(65) Prior Publication Data

US 2016/0040581 A1 Feb. 11, 2016

Related U.S. Application Data

(60) Provisional application No. 62/034,953, filed on Aug. 8, 2014.

(51) Int. Cl.
*F01N 3/00* (2006.01)
*F01N 11/00* (2006.01)
*F01N 3/20* (2006.01)

(52) U.S. Cl.
CPC ............ *F01N 11/002* (2013.01); *F01N 3/208* (2013.01); *F01N 11/00* (2013.01); *F01N 2550/05* (2013.01); *F01N 2610/144* (2013.01); *F01N 2610/1473* (2013.01);

(Continued)

(58) Field of Classification Search
CPC ........ F01N 11/00; F01N 11/002; F01N 3/208; F01N 2550/05; F01N 2610/144; F01N 2610/1473; F01N 2900/1812
See application file for complete search history.

(56) References Cited

U.S. PATENT DOCUMENTS

2003/0046928 A1* 3/2003 van Nieuwstadt ..... B01D 53/90
60/286
2009/0019835 A1* 1/2009 Dingle .................... F01N 11/00
60/282

FOREIGN PATENT DOCUMENTS

FR     2755726 A1 *  5/1998 ............. B01D 53/79
FR     3016183    *  1/2014 ............. F01N 11/00

* cited by examiner

*Primary Examiner* — Phutthiwat Wongwian
*Assistant Examiner* — Matthew T Largi
(74) *Attorney, Agent, or Firm* — Foley & Lardner LLP

(57) ABSTRACT

An SCR system may include a controller configured to diagnose errors with a dosing system. The controller may control a pump to compensate for a loss in pressure when dosing reductant and may maintain the pressure as close to a target pressure by modifying a parameter affecting the operation of the pump. The modification of the parameter may be used to determine an estimated flow feedback. The controller may use the estimated flow feedback data and commanded dosing amount data to calculate a percentage error in response to and using an integrated commanded flow and an integrated estimated flow feedback to detect errors of the dosing system. The errors may include an injector stuck closed error, a blocked pressure line error, a partial blockage of a pressure line or injector error, an injector stuck open error, a disconnected pressure line error, a leakage of a pressure line or injector error.

24 Claims, 7 Drawing Sheets

(52) U.S. Cl.
CPC ....... *F01N 2900/1812* (2013.01); *Y02T 10/24* (2013.01); *Y02T 10/47* (2013.01)

DIAGNOSING SYSTEM FOR REDUCTANT DOSING SYSTEM

CROSS-REFERENCE TO RELATED APPLICATIONS

The present application claims priority to U.S. Provisional Patent Application No. 62/034,953, filed Aug. 8, 2014 and the contents of which are hereby incorporated by reference.

TECHNICAL FIELD

The present application relates generally to the field of aftertreatment systems for internal combustion engines. More specifically, the present application relates to diagnostic systems for aftertreatment systems.

BACKGROUND

For internal combustion engines, such as diesel engines, nitrogen oxides ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber.

SUMMARY

One implementation relates to a method for diagnosing a reductant dosing system. The method includes accessing commanded dosing flow amount data and accessing estimated flow feedback data. The method also includes determining an integrated commanded flow amount based on the commanded dosing flow amount data and an integrated estimated flow feedback based on the estimated flow feedback. The method further includes determining a percentage error value in response to and using the integrated commanded flow amount and the integrated estimated flow feedback. The method still further includes determining an error based on the determined percentage error value and one or more predetermined error threshold values, and indicating the determined error.

In some implementations, the estimated flow feedback data is based on a parameter affecting operation of a pump of the dosing system. The parameter may be a speed or strokes of the pump. The parameter affecting operation of the pump may be modified to maintain a target pressure in a pressure line to a dosing module. In some implementations, the error is one of a stuck closed error, a partial blockage of a pressure line or injector error, a stuck open error, a disconnected pressure line error, a leakage of a pressure line or injector error. The stuck closed error and the partial blockage of a pressure line or injector error are determined based on a positive value for the percentage error value. The one or more threshold values may include a first threshold value of 90% for the stuck closed error and a second threshold value of 30% for the partial blockage of the pressure line or injector error. The stuck open error, the disconnected pressure line error, and the leakage of a pressure line or injector error are determined based on a negative value for the percentage error value. The one or more threshold values may include a first threshold value of −90% for the stuck open error or disconnected pressure line error and a second threshold value of −30% for the leakage of a pressure line or injector error.

Another implementation relates to a system that includes a pump, a dosing module, and a controller in electrical communication with the pump and the dosing module. The controller is configured to output a reductant pump parameter to control operation of the pump and output a dosing flow parameter to control an amount of reductant dosed by the dosing module. The controller is further configured to access dosing flow amount data based on outputted dosing flow parameters to the dosing module and access estimated reductant flow feedback data based on outputted reductant pump parameters to the reductant pump. The controller is still further configured to determine an integrated commanded flow amount based on the dosing flow amount data and an integrated estimated flow feedback based on the estimated flow feedback, determine a percentage error value in response to and using the integrated commanded flow amount and the integrated estimated flow feedback, and determine an error based on the determined percentage error value and one or more predetermined error threshold values. The controller also is configured to output an indication of the determined error.

In some implementations, the system also includes a pressure sensor configured to measure a pressure of reductant supplied from the pump to the dosing module. The controller is also configured to output the reductant pump parameter based on data indicative of a pressure measured by the pressure sensor. In some implementations, the controller is further configured to output the reductant pump parameter based on a target pressure to be maintained in a pressure line to the dosing module. The reductant pump parameter may include a parameter indicative of a speed or number of strokes of the pump. In some implementations, the error is one of a stuck closed error, a partial blockage of a pressure line or injector error, a stuck open error, a disconnected pressure line error, a leakage of a pressure line or injector error. The stuck closed error and the partial blockage of a pressure line or injector error may be determined based on a positive value for the percentage error value. The one or more threshold values may include a first threshold value of 90% for the stuck closed error and a second threshold value of 30% for the partial blockage of the pressure line or injector error. In some implementations, stuck open error, the disconnected pressure line error, and the leakage of a pressure line or injector error are determined based on a negative value for the percentage error value. The one or more threshold values may include a first threshold value of −90% for the stuck open error or disconnected pressure line error and a second threshold value of −30% for the leakage of a pressure line or injector error.

A further implementation relates to an apparatus that includes a controller in communication with a pump and a dosing module. The controller is configured to output a reductant pump parameter to control operation of the pump and output a dosing flow parameter to control an amount of reductant dosed by the dosing module. The controller is further configured to access dosing flow amount data based on outputted dosing flow parameters to the dosing module and access estimated reductant flow feedback data based on outputted reductant pump parameters to the reductant pump.

The controller is still further configured to determine an integrated commanded flow amount based on the dosing flow amount data and an integrated estimated flow feedback based on the estimated flow feedback, determine a percentage error value in response to and using the integrated commanded flow amount and the integrated estimated flow feedback, and determine an error based on the determined percentage error value and one or more predetermined error threshold values. The controller also is configured to output an indication of the determined error.

The reductant pump parameter may include a parameter indicative of a speed or number of strokes of the pump. The error may be one of a stuck closed error, a partial blockage of a pressure line or injector error, a stuck open error, a disconnected pressure line error, a leakage of a pressure line or injector error. The stuck closed error and the partial blockage of a pressure line or injector error are determined based on a positive value for the percentage error value. In some instances, one or more threshold values may include a first threshold value of 90% for the stuck closed error and a second threshold value of 30% for the partial blockage of the pressure line or injector error. The stuck open error, the disconnected pressure line error, and the leakage of a pressure line or injector error are determined based on a negative value for the percentage error value. In some instances, one or more threshold values comprises a first threshold value of −90% for the stuck open error or disconnected pressure line error and a second threshold value of −30% for the leakage of a pressure line or injector error.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
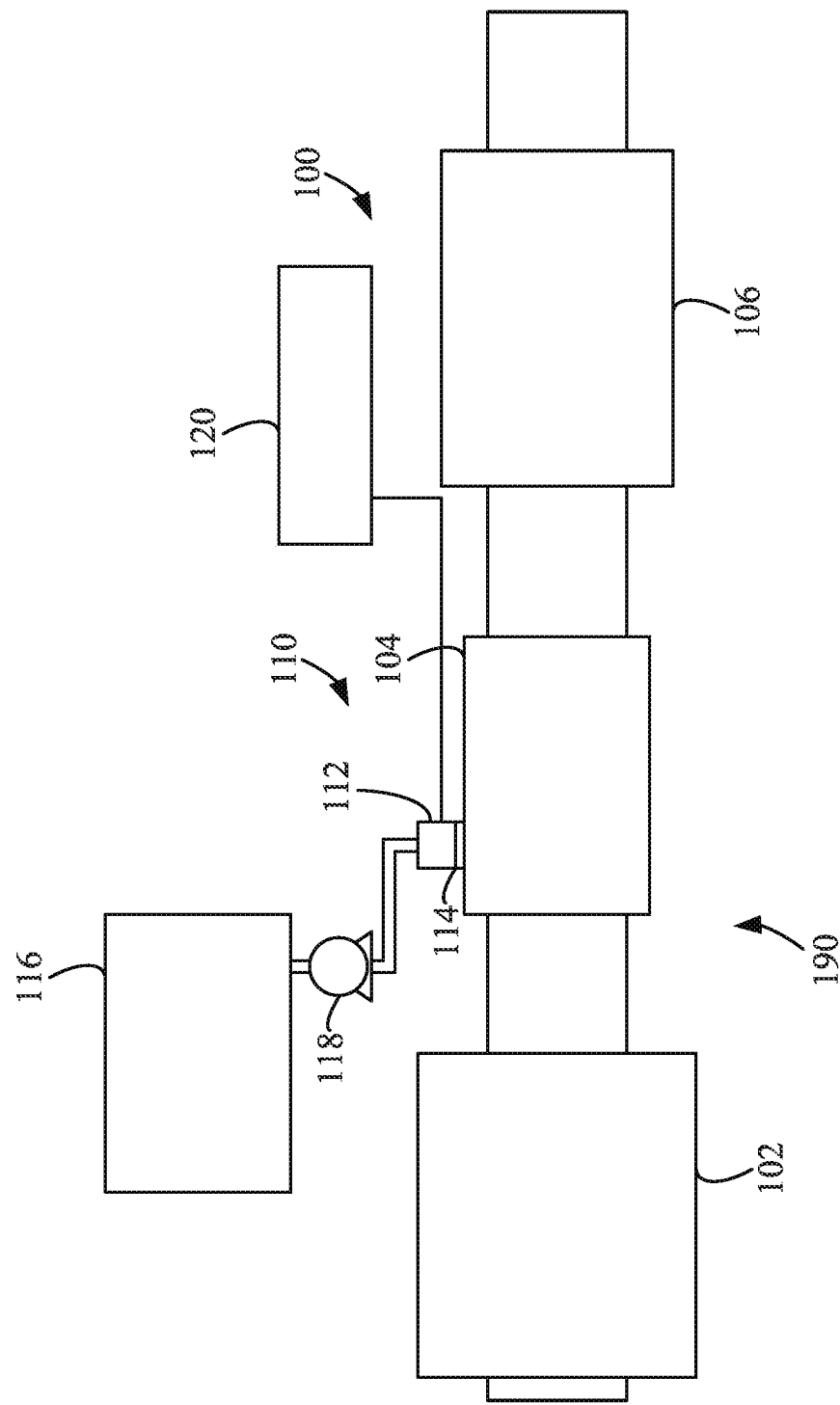
FIG. 1 is a block schematic diagram of a selective catalytic reduction system having a reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for injecting and mixing reductant into an exhaust flow of a vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust systems with SCR systems, a dosing module may be used to dose a reductant, such as urea, aqueous ammonia, or diesel exhaust fluid (DEF), into an exhaust system to reduce $NO_x$ emissions via a selective catalytic reduction (SCR) process. For such dosing modules and/or SCR systems dose sufficient reductant to reduce $NO_x$ emissions, the dosing modules and/or SCR systems need the dosing module to open and close, remain substantially free from blockages or leakages, and be supplied with adequately pressurized reductant. Accordingly, diagnosing errors or failure modes, such as a dosing module stuck open or closed, blockage or leakage of the dosing module, and/or pressure line blockage, leakage, and/or disconnection may be useful for the SCR system to maintain adequate performance.

An SCR system may include a controller configured to diagnose the aforementioned errors. For instance, an SCR system may include a pump that delivers reductant from a reductant source to the dosing module through a pressure line. The line pressure decreases when the dosing module is opened to deliver reductant into the exhaust system. The controller may actuate the pump to compensate for the loss in pressure and maintain the pressure as close to a target pressure by modifying a parameter affecting the operation of the pump, such as increasing a speed or strokes of the pump. The pump may be a rotary pump or displacement pump driven by a motor or solenoid. The modification of the parameter affecting the operation of the pump to maintain the target pressure provides an estimated flow feedback based on the system pressure and pump actuation. That is, when the dosing module is open and dosing, the speed by which the pump is increased to maintain the target pressure may be indicative of the amount of reductant flowing through the system and being dosed. The controller may use the estimated flow feedback information and a commanded dosing amount to calculate a percentage error or ratio value between the commanded flow to dosing module and the estimated flow feedback from to detect the abovementioned diagnosing errors.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the speed or strokes of the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The controller 120 may be structured to perform certain operations described herein. In certain implementations, the controller 120 forms a portion of a processing subsystem including one or more computing devices having memory, processing, and/or communication hardware. The controller 120 may be a single device or a distributed device, and the functions of the controller may be performed by hardware and/or as computer instructions on a non-transient computer readable storage medium.

In certain embodiments, the controller 120 includes one or more modules structured to functionally execute the operations of the controller 120. The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 3.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

III. Example Diagnosing System

Figure 2:
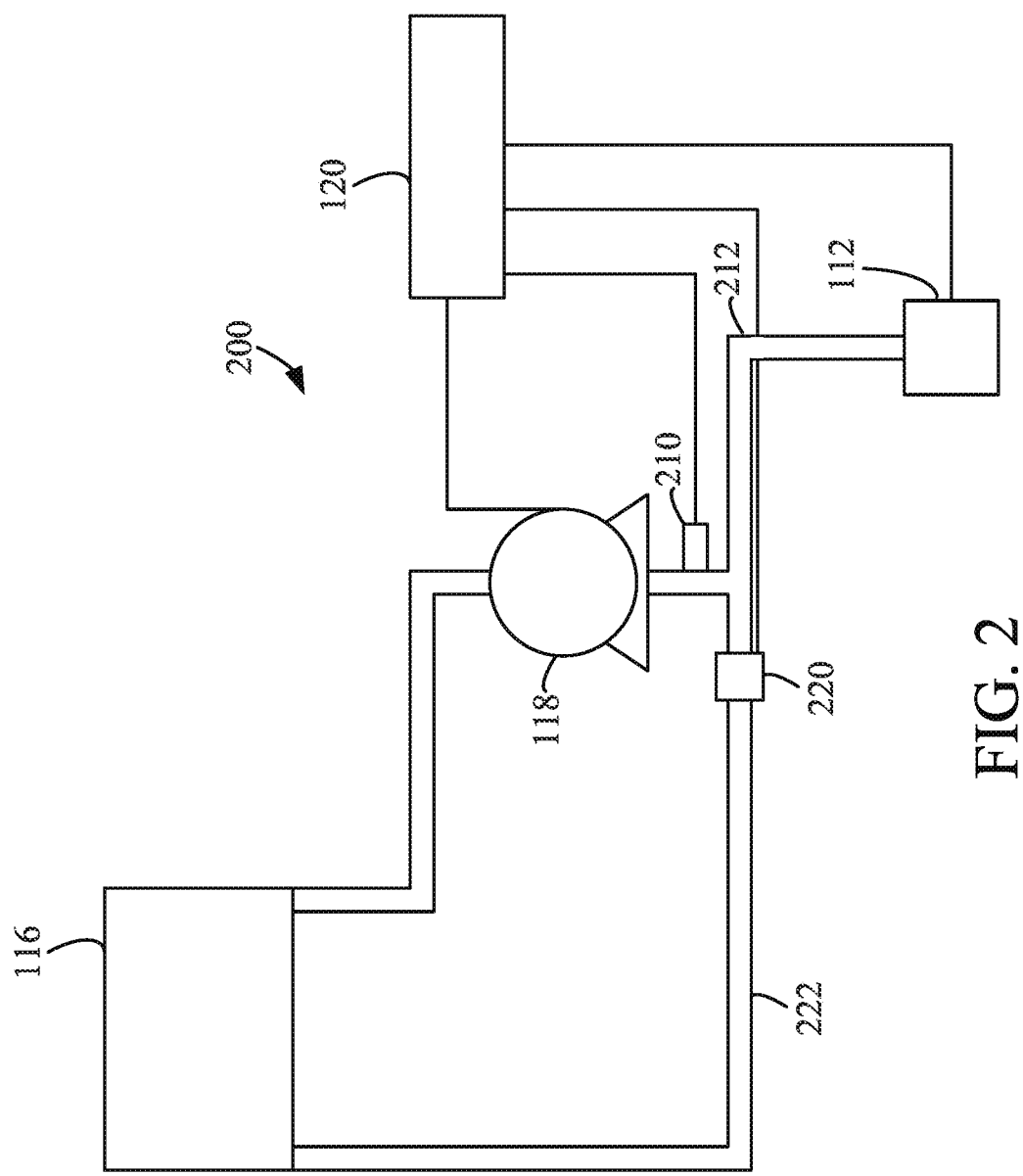
FIG. 2 is a block schematic of a portion of the selective catalytic reduction system showing the pump, dosing module, reductant source, and pressure lines in more detail.

FIG. 2 depicts components for a diagnosing system 200 for diagnosing an aftertreatment system having the reductant source 116, pump 118, dosing module 112, and controller 120. The diagnosing system 200 further includes a pressure sensor 210 to detect a pressure within a pressure line 212 fluidly coupling the pump 118 to the dosing module 112. In some implementations, a valve 220 may be provided to selectively fluidly couple a return line 222 in fluid communication with the reductant source 116 to the pump 118 and/or dosing module 112.

The pump 118 is in fluid communication with the reductant source 116 and is configured to receive reductant from the reductant source 116 and pump the reductant into the pressure line 212. The pressure line 212 is in fluid communication with the dosing module 112 and provides pressurized reductant from the pump 118 to the dosing module. The pressure sensor 210 is coupled to the pressure line 212 and is configured to detect a pressure of the fluid, such as reductant, within the pressure line 212. The pressure sensor 210 is configured to output data indicative of the detected pressure.

The dosing module 112 is configured to dose reductant received from the pressure line 212 into an exhaust system. The dosing module 112 may include an injector that can be opened, closed, and/or partially opened to control an amount of reductant dosed into the exhaust systems. In some implementations, the dosing module 112 doses reductant based on a commanded dosing flow amount determined by the controller 120. That is, the dosing module 112 may operate the injector to open, close, and/or partially open to dose reductant based on the received command from the controller 120 to dose an amount of reductant for the commanded dosing flow amount.

In some implementations, the valve 220 may be provided with a return line 222 to selectively open, close, and/or partially open to return reductant from the pressure line 212 to the reductant source 116. In some instances, the valve 220 may be a solenoid valve. In some implementations, the pump 118, pressure sensor 210, and valve 220 may be integrated into a pump assembly. Such a pump assembly may include additional components, such as a various sensors (e.g., temperature, quality, level, etc.), a heater, etc.

The controller 120 is in electrical communication with the pump 118, the pressure sensor 210, and the dosing module 112. The controller 120 may receive data from the pressure sensor 210 indicative of the pressure of the reductant in the pressure line 212 between the pump 118 and the dosing module 112. The controller 120 is also configured to selectively control the pump 118 to increase, decrease, and/or maintain the speed of the pump 118 or other operational aspects of the pump 118, such as, but not limited to, partial or full stroke mode of operation of the pump 118. The controller 120 is further configured to selectively control the dosing module 112 to inject reductant into an exhaust system. In some implementations, the controller 120 is also in electrical communication with the valve 220 to open, close, and/or partially open the valve 220.

In operation, the controller 120 may activate the pump 118 to pump reductant from the reductant source 116 into the pressure line 212 until a detected pressure detected by the pressure sensor 210 is substantially equal to a target pressure. The controller may, in some implementations, selectively control the pump 118 and/or the valve 220 to maintain the target pressure. When reductant is to be dosed into an exhaust system, the controller 120 may selectively control the dosing module 112 to dose reductant into the exhaust system.

The controller 120 may output a command signal to the dosing module 112 to control the dosing module 112. For instance, the controller 120 may determine a commanded dosing flow amount of reductant to be dosed by the dosing module 112. Based on the commanded dosing flow amount, the controller 120 may output a command signal to the dosing module 112 to open, close, and/or partially open an injector of the dosing module 112 to dose reductant.

When the dosing module 112 opens or partially opens the injector, the pressure in the pressure line 212 decreases. Such a pressure decrease may be detected by the pressure sensor 210. Responsive to the detected pressure decrease indicated by the pressure sensor 210, the controller 120 may modify a parameter affecting operation of the pump 118, such as increasing a speed and/or strokes of the pump 118 and/or otherwise control the operation of the pump 118, to compensate for the loss in pressure and/or maintains the pressure detected by the pressure sensor 210 as close to the target pressure. Such change in operation of the pump 118 may be used to determine an estimated flow feedback. That is, the increase, decrease, or no change to the operation of the pump 118 when the dosing module 112 is commanded to dose reductant may be indicative of an amount of reductant actually being dosed.

The controller 120 may use the commanded dosing flow amount and the estimated flow feedback to determine an error between the commanded dosing flow amount and the estimated flow feedback. In some implementations, the commanded dosing flow amount may be integrated for a predetermined threshold volume of commanded flow of reductant (e.g., 10 mL, 5 mL, etc.) to determine an integrated commanded flow. A period of time for the commanded dosing flow amount to reach the predetermined threshold volume may be determined and used to integrate the estimated flow feedback to determine an integrated estimated flow feedback. In other implementations, the commanded dosing flow amount may be integrated or summed over a period of time to determine an integrated commanded flow. Similarly, the estimated flow feedback may be integrated or summed over a period of time to determine an integrated estimated flow feedback. In some implementations, the period of time for the integrated commanded flow and integrated estimated flow feedback may be a predetermined period of time, such as 0.1 seconds, 1 second, 5 seconds, 10 seconds, 1 minute, etc. In other implementations, the period of time may be based on the command to the dosing module 112 (e.g., the period of time may be equal to the time the injector of the dosing module 112 is opened until the injector of the dosing module 112 is closed).

The controller 120 may determine percentage error value based on the equation:

$$\% \text{ Error} = \frac{\text{Integrated Commanded Flow} - \text{Integrated Estimated Flow Feedback}}{\text{Integrated Commanded Flow}} \times 100.$$

The value of the percentage error may be used to diagnose errors such as a dosing module stuck open or closed, blockage or leakage of the dosing module, and/or pressure line blockage, leakage, and/or disconnection.

For instance, if the percentage error is positive (i.e., the integrated commanded flow is greater than the integrated estimated flow feedback), then the percentage error value may be indicative of an injector of the dosing module 112 being stuck closed, a blockage of an injector of the dosing module 112, and/or a blockage in the pressure line 212. That is, the percentage error may be indicative of less reductant being dosed than commanded. In some implementations, the controller 120 may compare the determined percentage error value to one or more predetermined thresholds to determine which failure mode resulted in the error. For instance, if the percentage error value is greater than a first positive predetermined error threshold, such as 90%, then the controller 120 may set an error flag or other indicator that an injector of the dosing module 112 is stuck closed or the pressure line 212 is blocked. If the percentage error value is greater than a second positive predetermined error threshold, such as 30%, and below the first positive predetermined error threshold, such as 90%, then the controller 120 may set an error flag or other indicator that an injector of the dosing module 112 is partially blocked or the pressure line 212 is partially blocked. Responsive to the error flag, the controller 120 may activate an error indicator and/or output an error code to another system.

If the percentage error is negative (i.e., the integrated estimated flow feedback is greater than the integrated commanded flow), then the percentage error value may be indicative of an injector of the dosing module 112 being stuck open, a leakage of an injector of the dosing module 112, and/or in the pressure line 212, and/or a disconnected pressure line 212. That is, the percentage error may be indicative of greater reductant being dosed than commanded. In some implementations, the controller 120 may compare the determined percentage error value to one or more predetermined thresholds to determine which failure mode resulted in the error. For instance, if the percentage error value is less than a first negative predetermined error threshold, such as −90%, then the controller 120 may set an error flag or other indicator that an injector of the dosing module 112 is stuck open and/or the pressure line is disconnected. If the percentage error value is less than a second negative predetermined error threshold, such as −30%, and above the first negative predetermined error threshold, such as −90%, then the controller 120 may set an error flag or other indicator that an injector of the dosing module 112 is leaking or the pressure line 212 is leaking. Responsive to the error flag, the controller 120 may activate an error indicator and/or output an error code to another system.

In some implementations, the controller 120 may determine the percentage error a predetermined number of times prior to setting an error flag or other indicator. For instance, the controller 120 may determine the percentage error four times and set the error flag or other indicator if the percentage error is indicative of the error for the four times.

Figure 3:
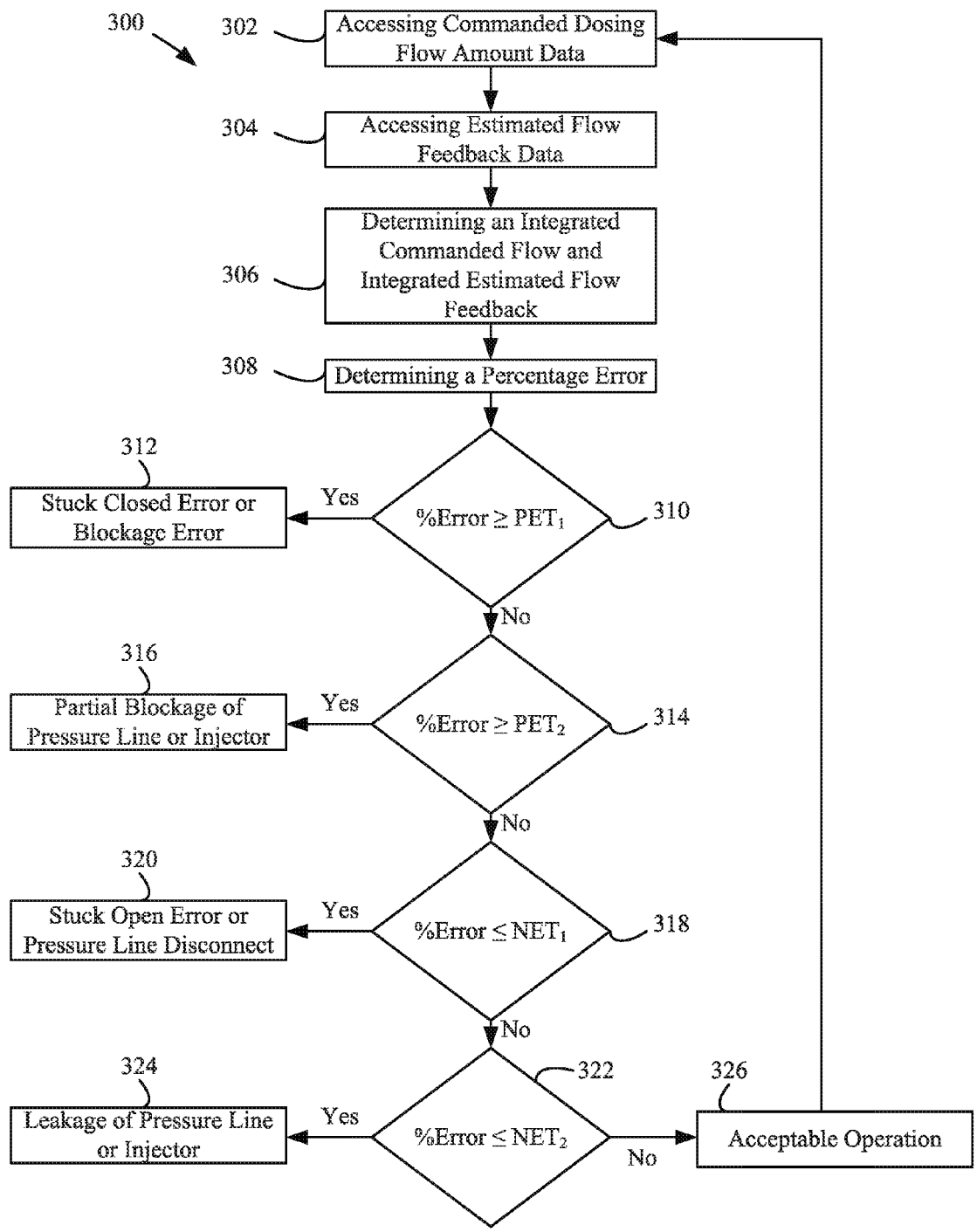
FIG. 3 is a block diagram an implementation of an exemplary process for detecting an error using a diagnosing system.

FIG. 3 depicts an exemplary process 300 for detecting an error using a diagnosing system, such as diagnosing system 200 of FIG. 2. The process 300 includes accessing commanded dosing flow amount data (block 302). The accessed commanded dosing flow amount data may be stored in a memory, such as a memory of the controller 120 and/or another device. In some implementations, the commanded dosing flow amount data may be temporarily stored and is overwritten each time process 300 is performed. The commanded dosing flow amount data may be a table of commanded dosing flow amounts and a timestamp associated with the commanded dosing flow amount.

At block 304, the estimated flow feedback data is accessed. The accessed estimated flow feedback data may be stored in a memory, such as a memory of the controller 120 and/or another device. In some implementations, the estimated flow feedback data may be temporarily stored and is overwritten each time the process 300 is performed. The estimated flow feedback data may be determined based on the change in operation of a pump, such as pump 118 of FIG. 2. That is, the estimated flow feedback data may determine a volume of reductant displaced based on the change in operation of the pump to maintain a target pressure within a pressure line, such as pressure line 212 of FIG. 2. The estimated flow feedback data may also be a table of determined estimated flow feedback amounts and a timestamp associated with the determined estimated flow feedback amounts.

At block 306, an integrated commanded flow and integrated estimated flow feedback is determined. The accessed commanded dosing flow amount data may be integrated for a predetermined threshold volume of commanded flow of reductant (e.g., 10 mL, 5 mL, etc.) to determine the integrated commanded flow. A period of time for the commanded dosing flow amount to reach the predetermined threshold volume may be determined and used to integrate the accessed estimated flow feedback data to determine an integrated estimated flow feedback. In other implementations, the accessed commanded dosing flow amount data may be integrated or summed over a period of time to determine an integrated commanded flow. Similarly, the accessed estimated flow feedback may be integrated or summed over the period of time to determine an integrated estimated flow feedback. In some implementations, the period of time for the integrated commanded flow and integrated estimated flow feedback may be a predetermined period of time, such as 0.1 seconds, 1 second, 5 seconds, 10 seconds, 1 minute, etc. In other implementations, the period of time may be based on the command to the dosing module (e.g., the period of time may be equal to the time the injector of the dosing module is opened until the injector of the dosing module is closed).

A percentage error may be determined (block 308) based on the determined integrated commanded flow and integrated estimated flow feedback. A controller, such as controller 120, may determine the percentage error value based on the equation:

$$\% \text{ Error} = \frac{\text{Integrated Commanded Flow} - \text{Integrated Estimated Flow Feedback}}{\text{Integrated Commanded Flow}} \times 100.$$

At block 310, a determination is made whether the determined percentage error is equal to or greater than a first positive predetermined error threshold ($PET_1$), such as 90%. If the determined percentage error is equal to or greater than the first positive predetermined error threshold, then an injector of the dosing module is stuck closed or the pressure line is blocked (block 312). An error flag or other indicator may be set based on determining that the injector of the dosing module is stuck closed. A controller may activate an error indicator and/or output an error code to another system responsive to determining that the injector of the dosing module is stuck closed or the pressure line is blocked.

If the determined percentage error is less than a first positive predetermined error threshold, then the process 300 proceeds to determining whether the determined percentage error is equal to or greater than a second positive predetermined error threshold ($PET_2$), such as 30% (block 314). If the determined percentage error is equal to or greater than the second positive predetermined error threshold, then a partial blockage of a pressure line or an injector of the dosing module is indicated (block 316). An error flag or other indicator may be set based on determining the partial blockage of the pressure line or an injector of the dosing module. A controller may activate an error indicator and/or output an error code to another system responsive to determining the partial blockage of the pressure line or an injector of the dosing module.

If the determined percentage error is less than the second positive predetermined error threshold, then a determination may be made whether the determined percentage error is equal to or less than a first negative predetermined error threshold ($NET_1$), such as −90% (block 318). If the determined percentage error is equal to or less than the first negative predetermined error threshold (i.e., % Error is −95%), then an injector of the dosing module is stuck open or the pressure line may be disconnected (block 320). An error flag or other indicator may be set based on determining that the injector of the dosing module is stuck open or the pressure line may be disconnected. A controller may activate an error indicator and/or output an error code to another system responsive to determining that the injector of the dosing module is stuck open or the pressure line may be disconnected.

If the determined percentage error is greater than a first negative predetermined error threshold (i.e., % Error is −70%), then the process 300 proceeds to determining whether the determined percentage error is equal to or less than a second negative predetermined error threshold ($NET_2$), such as −30% (block 322). If the determined percentage error is equal to or less than the second negative predetermined error threshold, then a leakage of a pressure line or an injector of the dosing module is indicated (block 324). An error flag or other indicator may be set based on determining the leakage of the pressure line or an injector of the dosing module. A controller may activate an error indicator and/or output an error code to another system responsive to determining the leakage of the pressure line or an injector of the dosing module.

If the determined percentage error is greater than the second negative predetermined error threshold, then the process 300 may indicate acceptable operation (block 326) of the dosing system. That is, if the determined percentage error is between the second positive predetermined error threshold and the second negative predetermined error threshold, then the dosing system may be operating within an acceptable range. The process 300 may return to block 302 and/or may end. The second positive predetermined error threshold and the second negative predetermined error threshold may be predetermined values set based on what acceptable operating conditions may be (e.g., 5% and −5%, 10% and −10%, 15% and −15%, 20% and −20%, 25% and −25%, etc.).

In some implementations, the determinations relative to error thresholds (blocks 310, 314, 318, 322) may be in other orders. In some implementations, a determination may initially be made whether the determined percentage error is less than the second positive predetermined error threshold and greater than the second negative predetermined error threshold. If so, then the process 300 may return to block 302 and/or may end.

Figure 4:
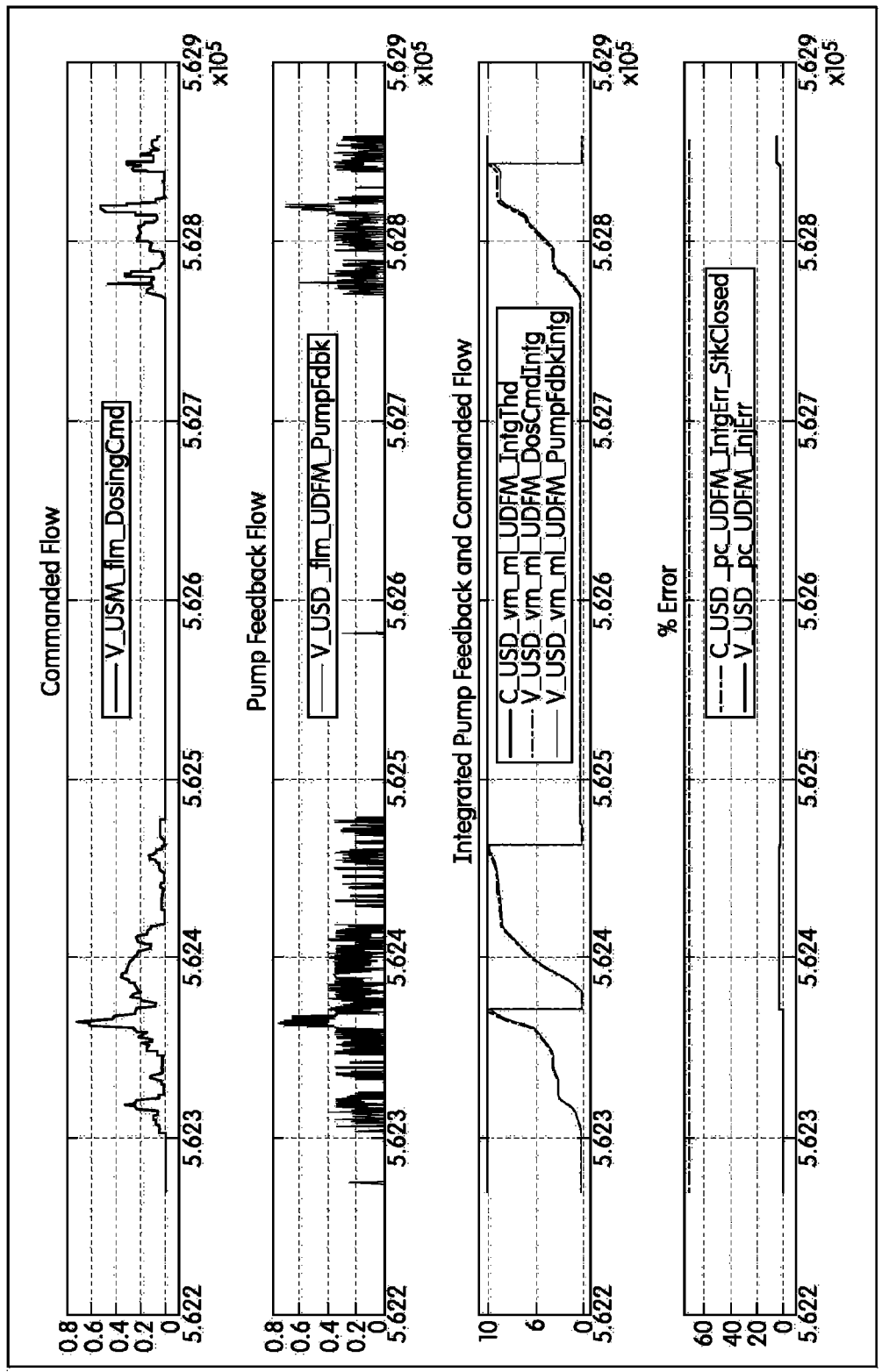
FIG. 4 is a set of graphical plots of several values for a commanded dosing flow amount, an estimated feedback flow, an integrated pump feedback flow and commanded dosing flow, and a determined error percentage over time for an operational dosing module.

FIG. 4 is a set of graphical plots of several values for a commanded dosing flow amount, an estimated feedback flow, an integrated pump feedback flow and commanded dosing flow, and a determined error percentage over time for an operational dosing module. The integrated pump feedback and commanded flow values are substantially the same, resulting in a percentage error value of approximately 1 or an error value of approximately 0%.

Figure 5:
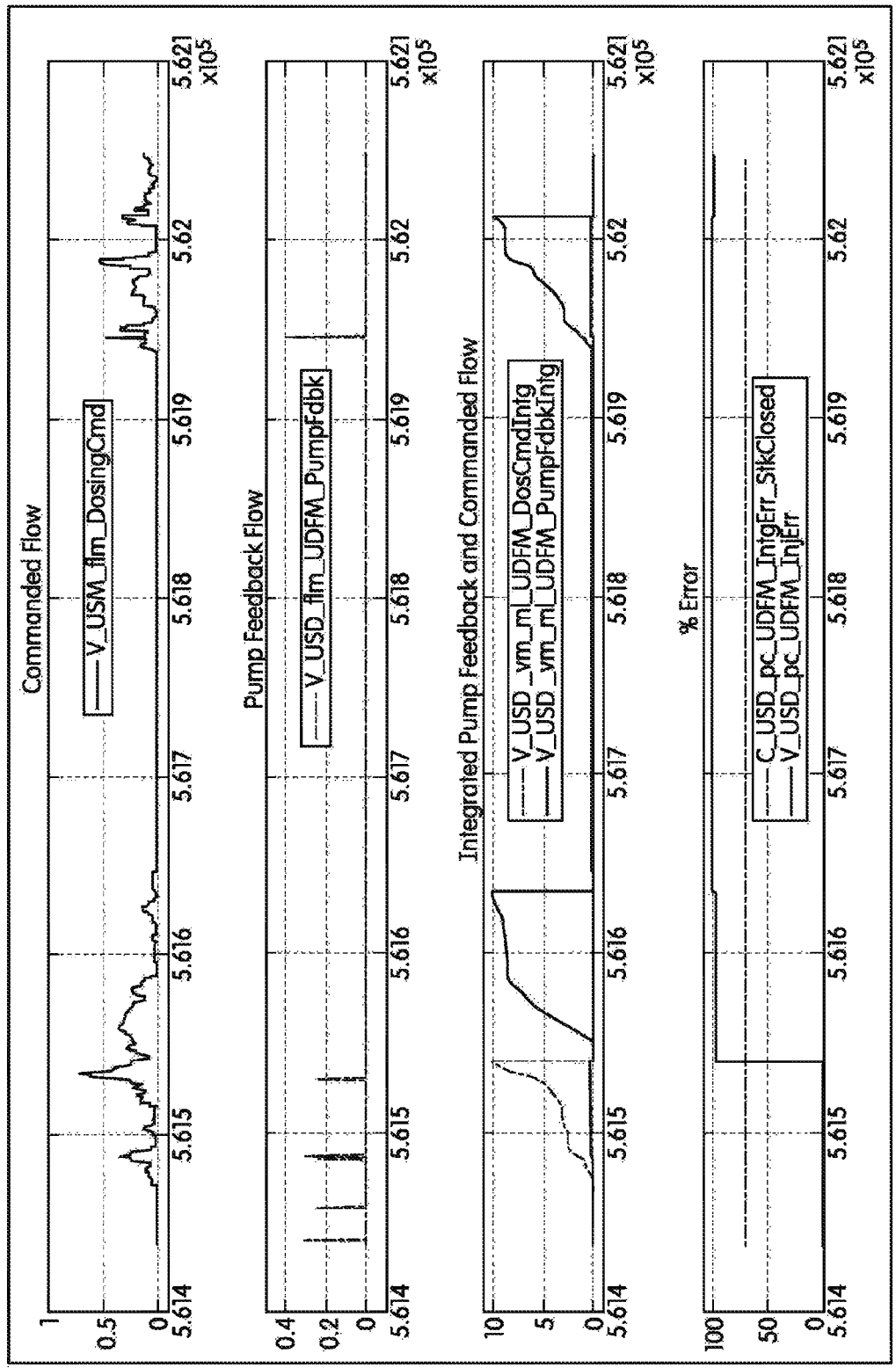
FIG. 5 is a set of graphical plots of several values for a commanded dosing flow amount, an estimated feedback flow, an integrated pump feedback flow and commanded dosing flow, and a determined error percentage over time for a stuck closed dosing module.

FIG. 5 is a set of graphical plots of several values for a commanded dosing flow amount, an estimated feedback flow, an integrated pump feedback flow and commanded dosing flow, and a determined error percentage over time for a stuck closed dosing module. The integrated pump feedback values are substantially zero while the commanded flow values vary as a controller transmits reductant dosing command values to a dosing module. This results in a percentage error value that varies at values greater than 1, resulting in a positive error value of approximately 100%, indicating a stuck closed error.

Figure 6:
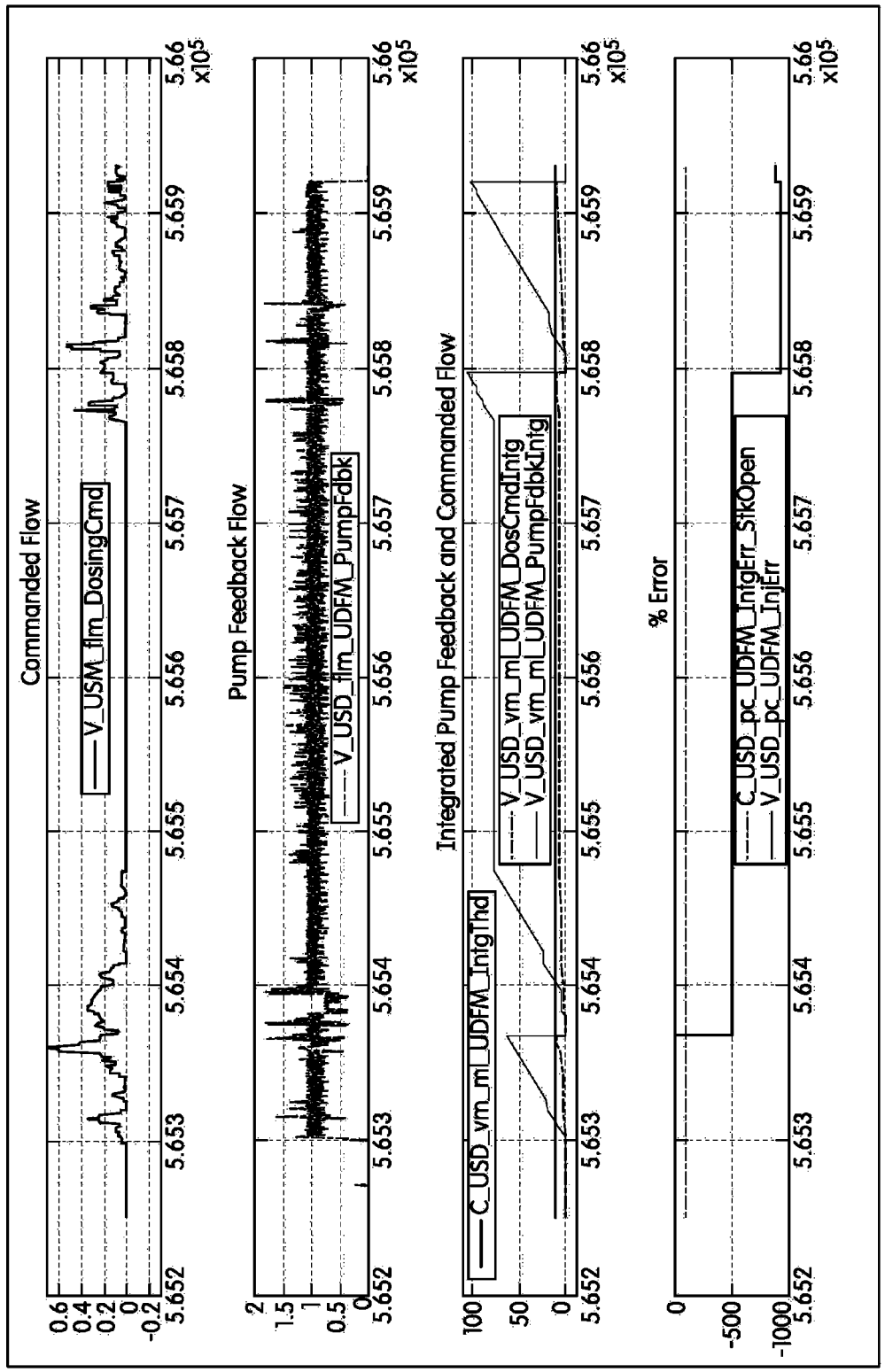
FIG. 6 is a set of graphical plots of several values for a commanded dosing flow amount, an estimated feedback flow, an integrated pump feedback flow and commanded dosing flow, and a determined error percentage over time for a stuck open dosing module.

FIG. 6 is a set of graphical plots of several values for a commanded dosing flow amount, an estimated feedback flow, an integrated pump feedback flow and commanded dosing flow, and a determined error percentage over time for a stuck open dosing module. The integrated pump feedback values increase significantly while the commanded flow values vary as a controller transmits reductant dosing command values to a dosing module. This results in a percentage error value that varies at values less than 1, resulting in a negative error values, indicating a stuck open error.

Figure 7:
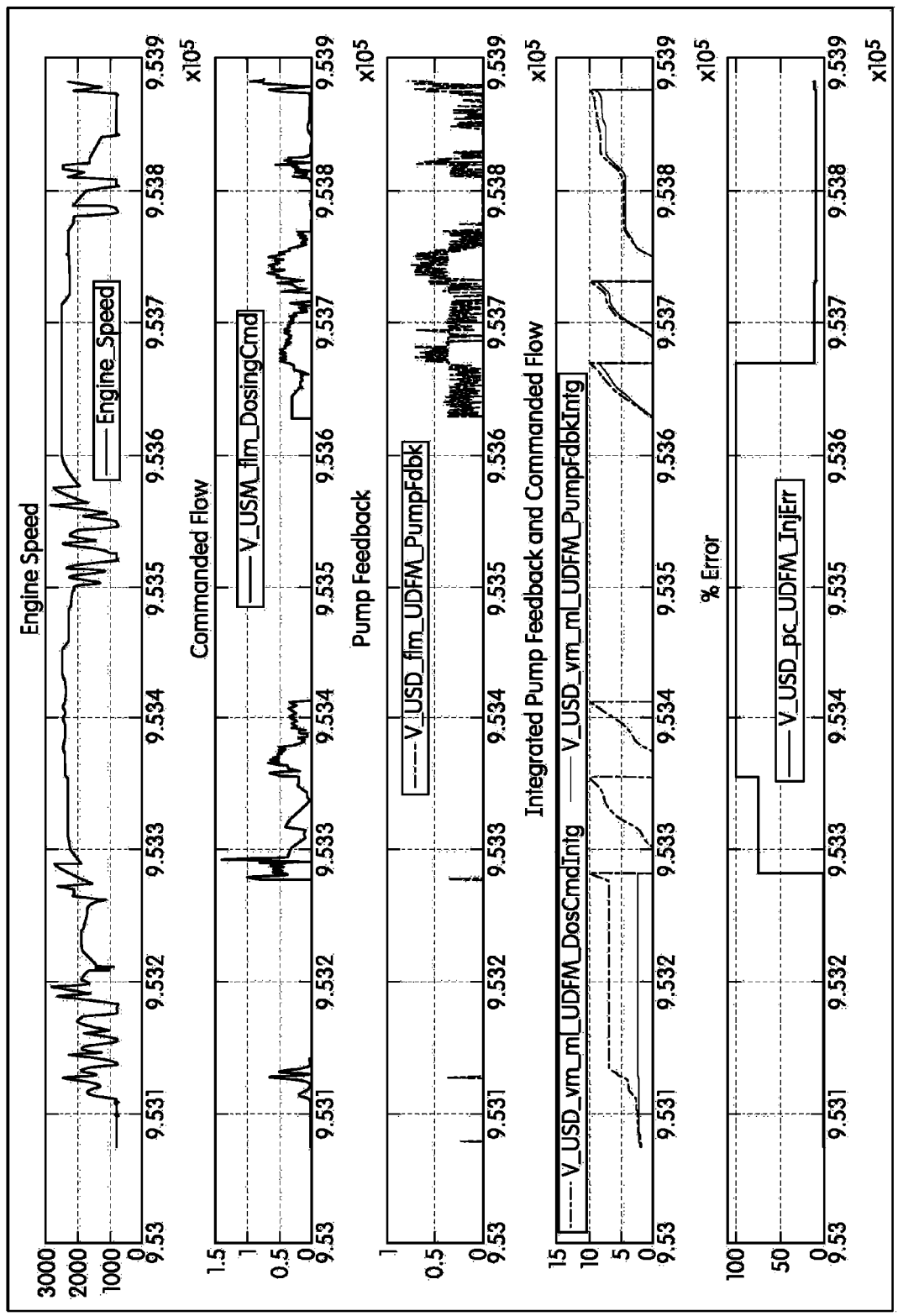
FIG. 7 is a set of graphical plots of several values for a commanded dosing flow amount, an estimated feedback flow, an integrated pump feedback flow and commanded dosing flow, and a determined error percentage over time for a stuck closed dosing module that is reset to normal operation.

FIG. 7 is a set of graphical plots of several values for a commanded dosing flow amount, an estimated feedback flow, an integrated pump feedback flow and commanded dosing flow, and a determined error percentage over time for a stuck closed dosing module that is reset to normal operation. The integrated pump feedback values are initially substantially zero while the commanded flow values are vary as a controller transmits reductant dosing command values to a dosing module. This results in a percentage error that value varies at values greater than 1, resulting in a positive error value of approximately 100%, indicating a stuck closed error. Later, the integrated pump feedback and commanded flow values are substantially the same, resulting in a percentage error value of approximately 1 or an error value of approximately 0%, indicating normal operation again.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially," "approximately," and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for diagnosing a reductant dosing system comprising:
   accessing commanded dosing flow amount data;
   accessing estimated flow feedback data;
   wherein the estimated flow feedback data is based on a parameter affecting operation of a pump of the dosing system;
   determining, using a controller, an integrated commanded flow amount based on the commanded dosing flow amount data and an integrated estimated flow feedback based on the estimated flow feedback;
   determining, using the controller, a percentage error value in response to and using the integrated commanded flow amount and the integrated estimated flow feedback;
   determining, using the controller, an error based on the determined percentage error value and one or more predetermined error threshold values; and
   indicating the determined error.

2. The method of claim 1, wherein the parameter is a speed or strokes of the pump.

3. The method of claim 1, wherein the parameter affecting operation of the pump is modified to maintain a target pressure in a pressure line to a dosing module.

4. The method of claim 1, wherein the error is one of a stuck closed error, a partial blockage of a pressure line or injector error, a stuck open error, a disconnected pressure line error, a leakage of a pressure line or injector error.

5. The method of claim 4, wherein the stuck closed error and the partial blockage of a pressure line or injector error are determined based on a positive value for the percentage error value.

6. The method of claim 5, wherein the one or more threshold values comprises a first threshold value of 90% for the stuck closed error and a second threshold value of 30% for the partial blockage of the pressure line or injector error.

7. The method of claim 4, wherein the stuck open error, the disconnected pressure line error, and the leakage of a pressure line or injector error are determined based on a negative value for the percentage error value.

8. The method of claim 7, wherein the one or more threshold values comprises a first threshold value of −90% for the stuck open error or disconnected pressure line error and a second threshold value of −30% for the leakage of a pressure line or injector error.

9. A system comprising:
   a pump;
   a dosing module; and
   a controller in electrical communication with the pump and the dosing module, the controller configured to:
      output a reductant pump parameter to control operation of the pump,
      output a dosing flow parameter to control an amount of reductant dosed by the dosing module,
      access dosing flow amount data based on outputted dosing flow parameters to the dosing module,
      access estimated reductant flow feedback data based on outputted reductant pump parameters to the reductant pump,
      determine an integrated commanded flow amount based on the dosing flow amount data and an integrated estimated flow feedback based on the estimated flow feedback,
      determine a percentage error value in response to and using the integrated commanded flow amount and the integrated estimated flow feedback,
      determine an error based on the determined percentage error value and one or more predetermined error threshold values, and
      output an indication of the determined error.

10. The system of claim 9 further comprising:
    a pressure sensor configured to measure a pressure of reductant supplied from the pump to the dosing module,
    wherein the controller is configured to output the reductant pump parameter based on data indicative of a pressure measured by the pressure sensor.

11. The system of claim 10, wherein the controller is further configured to output the reductant pump parameter based on a target pressure to be maintained in a pressure line to the dosing module.

12. The system of claim 11, wherein the reductant pump parameter comprises a parameter indicative of a speed or number of strokes of the pump.

13. The system of claim 9, wherein the error is one of a stuck closed error, a partial blockage of a pressure line or injector error, a stuck open error, a disconnected pressure line error, a leakage of a pressure line or injector error.

14. The system of claim 13, wherein the stuck closed error and the partial blockage of a pressure line or injector error are determined based on a positive value for the percentage error value.

15. The system of claim 14, wherein the one or more threshold values comprises a first threshold value of 90% for the stuck closed error and a second threshold value of 30% for the partial blockage of the pressure line or injector error.

16. The system of claim 13, wherein the stuck open error, the disconnected pressure line error, and the leakage of a pressure line or injector error are determined based on a negative value for the percentage error value.

17. The system of claim 16, wherein the one or more threshold values comprises a first threshold value of −90% for the stuck open error or disconnected pressure line error and a second threshold value of −30% for the leakage of a pressure line or injector error.

18. An apparatus comprising a controller in communication with a pump and a dosing module, the controller configured to:
    output a reductant pump parameter to control operation of the pump;
    output a dosing flow parameter to control an amount of reductant dosed by the dosing module;
    access dosing flow amount data based on outputted dosing flow parameters to the dosing module;
    access estimated reductant flow feedback data based on outputted reductant pump parameters to the reductant pump;
    determine an integrated commanded flow amount based on the dosing flow amount data and an integrated estimated flow feedback based on the estimated flow feedback;

determine a percentage error value in response to and using the integrated commanded flow amount and the integrated estimated flow feedback;

determine an error based on the determined percentage error value and one or more predetermined error threshold values; and output an indication of the determined error.

19. The apparatus of claim 18, wherein the reductant pump parameter comprises a parameter indicative of a speed or number of strokes of the pump.

20. The apparatus of claim 18, wherein the error is one of a stuck closed error, a partial blockage of a pressure line or injector error, a stuck open error, a disconnected pressure line error, a leakage of a pressure line or injector error.

21. The apparatus of claim 20, wherein the stuck closed error and the partial blockage of a pressure line or injector error are determined based on a positive value for the percentage error value.

22. The apparatus of claim 21, wherein the one or more threshold values comprises a first threshold value of 90% for the stuck closed error and a second threshold value of 30% for the partial blockage of the pressure line or injector error.

23. The apparatus of claim 20, wherein the stuck open error, the disconnected pressure line error, and the leakage of a pressure line or injector error are determined based on a negative value for the percentage error value.

24. The apparatus of claim 23, wherein the one or more threshold values comprises a first threshold value of −90% for the stuck open error or disconnected pressure line error and a second threshold value of −30% for the leakage of a pressure line or injector error.

* * * * *